(12) United States Patent
Liebmann

(10) Patent No.: US 8,240,992 B2
(45) Date of Patent: Aug. 14, 2012

(54) METHOD OF MANUFACTURING A FIBRE-REINFORCED PART FOR A WIND POWER PLANT

(75) Inventor: Axel Liebmann, Velje O (DK)

(73) Assignee: LM Glasfiber A/S, Lunderskov (DK)

( * ) Notice: Subject to any disclaimer, the term of this patent is extended or adjusted under 35 U.S.C. 154(b) by 1121 days.

(21) Appl. No.: 11/793,585

(22) PCT Filed: Dec. 22, 2005

(86) PCT No.: PCT/DK2005/000816
§ 371 (c)(1),
(2), (4) Date: May 20, 2008

(87) PCT Pub. No.: WO2006/066593
PCT Pub. Date: Jun. 29, 2006

(65) Prior Publication Data
US 2008/0304971 A1     Dec. 11, 2008

(30) Foreign Application Priority Data
Dec. 22, 2004   (DK) ................................ 2004 01988

(51) Int. Cl.
*B63H 11/00* (2006.01)
*B64C 15/02* (2006.01)
*B64C 27/18* (2006.01)

(52) U.S. Cl. .................................. 416/20 R; 416/241 R

(58) Field of Classification Search ........................ None
See application file for complete search history.

(56) References Cited

U.S. PATENT DOCUMENTS

| 5,843,354 A * | 12/1998 | Evans et al. ................... 264/136 |
| 2003/0141721 A1* | 7/2003 | Bartlett ............................. 290/55 |
| 2005/0123743 A1* | 6/2005 | Martinazzo .................... 428/328 |
| 2005/0180854 A1* | 8/2005 | Grabau et al. ............ 416/241 R |

\* cited by examiner

*Primary Examiner* — Ha Tran T Nguyen
*Assistant Examiner* — Valerie N Brown
(74) *Attorney, Agent, or Firm* — The Nath Law Group; Jerald L. Meyer; Robert T. Burns

(57) ABSTRACT

The invention relates to a method of manufacturing fibre-reinforced parts for a wind power plant such as eg a blade, wherein the method comprises laying out a first, outermost layer of film in the interior surface of an open mould; following which different layers are arranged on top of the first layer, comprising layers of fiber material; and wherein resin is applied for joining the laid-out layers to each other. By use of a film for the outermost layer a moulding process results that provides a major improvement of the working conditions. A further advantage is also that, compared to the use of gelcoat, a surface is accomplished which is more resistant to physical influences in the form of eg cyclical stresses on the element. The invention also relates to a fiber-reinforced part for a wind power plant, eg a blade, wherein the part is structured from a first, outermost layer, and also to a blade for a wind power plant and comprising a fiber-reinforced part according to the invention.

12 Claims, 2 Drawing Sheets

METHOD OF MANUFACTURING A FIBRE-REINFORCED PART FOR A WIND POWER PLANT

The invention relates to a method of manufacturing fibre-reinforced parts for a wind power plant, such as eg a blade. The invention also relates to a fibre-reinforced part for a wind power plant such as eg a blade. Finally the invention relates to a blade for a wind power plant comprising a fibre-reinforced part.

BACKGROUND

In the context of manufacturing fibre-reinforced parts, eg blades for a wind power plant, a manufacturing process is typically employed in which the blade is moulded in two halves in each their open mould, wherein a coat of gelcoat is initially applied onto the interior surface of the open mould. A number of layers of fibre material are subsequently arranged, following which resin is finally applied to attach the individual layers of fibre material to each other. The resin can be applied to the layers manually by RTM (resin transfer moulding), VARTM (vacuum assisted resin transfer moulding) or other suitable methods. Alternatively the resin can be applied to the laminate layers prior to laying of the layers (Prepeg). In the context of this, gelcoat will harden and form the blade surface.

In connection with such moulding process, the use of gelcoat is associated with major drawbacks with regard to the working environment, ia due to it having a large content of styrene, and ia during the hardening process inconvenient vapours are emitted. Therefore it is typically the case that robots are used in connection with application of gelcoat onto the interior surface of the mould, thereby enabling evacuation of staff from the moulding premises during the application process in order to thereby minimize the risk of the staff being exposed to the poor working conditions. However, typically further treatment will always be needed, and the presence of staff in relatively close contact with the gelcoat layer will always be required for the further process.

A further problem of gelcoat is that it is a brittle material and there is a risk of air pockets forming on the final surface. In connection with blades for wind turbines this may mean that water may collect in the pockets meaning that the blade is damaged in case a lightning strikes the blade.

Finally the gelcoat process as such is a very time-consuming one which is to be followed by a time-consuming cleaning of the equipment used for the application of gelcoat.

US 2004 0146714 teaches a method of manufacturing fibre-reinforced structures such as eg boat hulls, bathtubs, or car parts, wherein a thin composite hybrid layer of a thermoplastic acrylic polymer and a thermoplastic polymer are arranged distally followed by one or more fibre layers and optionally foam parts. The outermost hybrid layer which has good wear and cosmetic properties is formed initially by thermoforming processes in one mould and is then inserted into a second, closed mould along with fibre layer and foam parts, following which the mould is closed and resin injected. However, the dimensions of the thermoformed hybrid layer will unavoidably deviate from those of the fixed mould parts ia due to internal stresses in the layer and contractions following the thermoforming. This gives rise to difficulties in connection with the RTM-process where the strength of the connection between the various layers is reduced, and likewise the surface finish of the finished element may be scratched when the mould is closed.

OBJECT AND DESCRIPTION OF THE INVENTION

It is thus an object of the invention to provide a solution to the above problems.

This is accomplished by a method of manufacturing fibre-reinforced parts for a wind power plant, such as eg a blade, wherein the method comprises laying out different layers comprising layers of fibre-reinforced material in the interior surface of an open mould, and wherein resin is finally applied for mutual adhesion between the laid layers. Outermost on the interior surface of the open mould, several layers of film are arranged. When a film is used for the outermost layer, a moulding process results that will provide a major improvement of the working conditions. It is a further advantage that, compared to the use of gelcoat, a surface is provided which is more resistant to physical impacts in the form of eg cyclical stresses on the element. Moreover a manufacturing process is accomplished which is relatively quick since the laying as such of the film is expedient and considerably faster than the application of gelcoat. For instance, the film can consist of thermoplastics or a thermo-hardening plastics material, and according to one embodiment the film may comprise a fibre-reinforcement. Arrangement of several layers of film on the interior surface of the open mould results in an element surface of increased strength which wears more slowly—not only due to the increased thickness of the combined outermost layer, but also due to that layer being composed of several layers of film. This compares to the surface of increased strength accomplished on an element which is varnished eg five times with a thin layer rather than being varnished once with a layer having five times that thickness. The element being manufactured with several layers of film distally, it becomes an option that the element can be worn and a layer of film hence be worn off completely or partially without ensuing consequences to the structural properties of the element as such. Correspondingly the method according to the invention enables removal of a layer of film on the finished element, for instance when it is desired to do so due to the colour or the effect having faded. Moreover, in case of soiling of the outermost layer, it is an option to remove the layer in order to thereby obtain a clean surface and hence obviate the need for cleaning the surface.

According to one embodiment at least one of the film layers is of a thermoplastic material. In particular by use of thermoplastic film a surface is accomplished that is more resistant to wear due to physical influences in the form of eg cyclical stresses of the element or wear.

According to one embodiment, at least one of the film layers is adapted to the shape of the interior surface of the open mould by vacuum being provided between the interior surface and the film. This is a particularly simple manner in which the film can be adapted to the shape of the interior surface of the open mould. For instance air holes may be provided in the interior surface of the open mould, and by sucking air out of them, the film is attracted to the interior surface and is hence adapted to the shape of the interior surface.

According to one embodiment at least one of the film layers is further adapted to the shape of the interior surface of the mould by the film being heated. Thereby wrinkles are minimised when the film sits on the interior surface and hence an entirely even layer of film is ensured on the interior surface of the open mould.

According to one embodiment the heating takes place by use of heat-emitting radiation such as eg IR (InfraRed) radiation. Thereby external means can be used to heat the film following its arrangement in the open mould and the heat can be adapted locally as needed in various areas of the film. When IR light is used, radiation rich in energy is employed.

According to one embodiment films having different properties are used in different areas of the interior surface of the open mould. Films may possess different properties, such as ice and soil repellence, colouring, aerodynamic optimisation, commercials; and by arranging films having different properties in different locations on the element, an element results that has a surface where the surface properties vary. For instance, in some places an ice-repellent surface is desired, such places being very exposed to ice formation; whereas an aerodynamic film is desired elsewhere which provides additional protection against extreme physical influences.

According to yet an embodiment at least a further layer of film is arranged on at least a part of the fibre-reinforced part following removal from the mould. Hereby it is accomplished that the fibre-reinforced element can be provided with an additional film surface elsewhere, eg on locations that are very exposed to wear or where other effects of the film are desirable. For instance, coloured blade tips or the like can quickly be imparted to a blade in this manner. Likewise the method enables the laying in a simple manner of a further film as a part of the finish of the element, eg across joints.

Moreover the invention relates to a fibre-reinforced part for a wind power plant such as eg a blade, wherein the part is structured from a first outermost layer followed by layers of fibre-reinforced material which are attached to each other by use of resin, and wherein the first outermost layer comprises several film layers. When a film is used as the outermost layer, a moulding process is accomplished that provides a major improvement in the working conditions. A further advantage is provided in that, compared to the use of gelcoat, a surface can be accomplished which has increased resistance to physical impacts in the form of eg cyclical stresses of the element. By letting the first distal layer comprise several layers of film it is accomplished that one or more film layers can be removed when the colour or the effect has faded, or as mentioned previously it can be worn off without the structural properties of the element as such deteriorating. Moreover, in case of soiling of the outermost layer, it is an option to remove a layer in order to thereby provide a clean surface and hence obviate the need for cleaning the surface.

According to one embodiment, the first outermost layer consists of several layers of film, wherein films of different properties are arranged in different areas of the fibre-reinforced part. Films may possess different properties, such as ice and soil repellence, colours, aerodynamic optimisation, commercials; and by arrangement of films with different properties in different locations on the element, an element is accomplished that has a surface where the surface properties vary. For instance, there may be locations where it is desired to have an ice-repellent surface, such areas being very exposed to ice formation, whereas in other locations it is desired to have an aerodynamic film that provides additional protection against external physical influences.

According to one embodiment the film layers comprise a film having a surface which is ice-repellent. Thereby it is avoided that ice settles on the element and when the element is for instance a wind turbine it is avoided that ice settles on the blade which would ia considerably deteriorate the aerodynamic properties of the blade. Moreover it may also bring about an imbalance in the rotor which may mean that the wind turbine stops or, in a worst case scenario, breaks.

According to one embodiment the film layers comprise a film with a surface which is aerodynamically optimised. The use of such film on eg a fibre-reinforced element in the form of the blade of a wind turbine of a wind power plant brings about an improved performance of the wind power plant.

Finally, the invention relates to a blade for a wind power plant characterised in comprising a fibre-reinforced part as described above.

BRIEF DESCRIPTION OF DRAWING

In the following the invention will be described in further detail with reference to figures that show exemplary embodiments of the invention.

DESCRIPTION OF EMBODIMENTS

Figure 1:
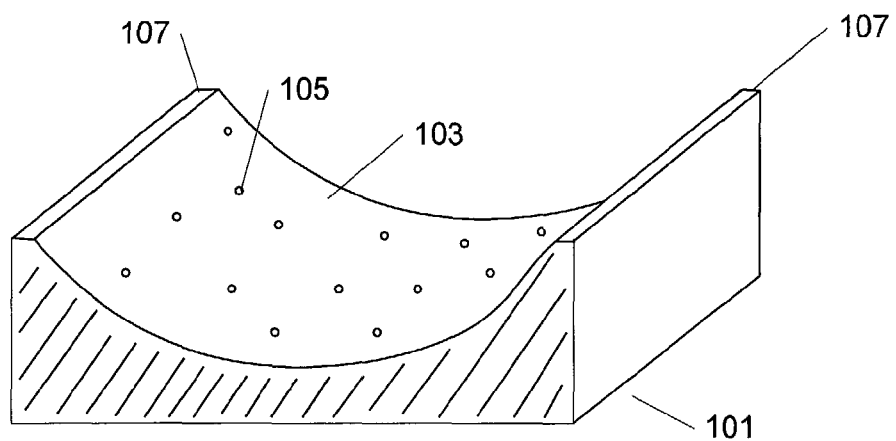
FIG. 1 shows a part of an open mould for moulding a blade shell having film as its outer layer.

FIG. 1 shows a sectional view of an open mould 101 that can be used in connection with the manufacture of a fibre-reinforced part, wherein the outermost layer of the part is a film. The interior surface 103 of the mould comprises a number of vacuum holes 105 and an edge 107. The open mould is used in that a layer of film, preferably a thermoplastics film, is arranged on the interior surface 013 of the mould; the film is adapted to the shape of the interior surface of the open mould in that a vacuum is provided between the mould and the film. This takes place by air being sucked out of the vacuum holes, and in that context the film could initially be attached or secured to the edge 107 to enhance the vacuum effect. Then a number of layers of fibre material are arranged, following which resin is finally added to adhere the individual layers of fibre material to each other, and when the resin is cured a fibre-reinforced portion is formed where the film constitutes the outermost layer. In order to spare the moulds it is an option, prior to arrangement of the film, to wax the interior surface to reduce wear on the mould. One example of a fibre-reinforced part could be a part for a wind power plant such as eg a blade, a tower, or a nacelle cowling.

According to one embodiment the vacuum holes could be used to secure the element by means of vacuum when it is to be joined by gluing to another element. For instance in the joining of two blade shells. In that connection the holes can also be used to eject the elements from the mould by means of air pressure.

Figure 2:
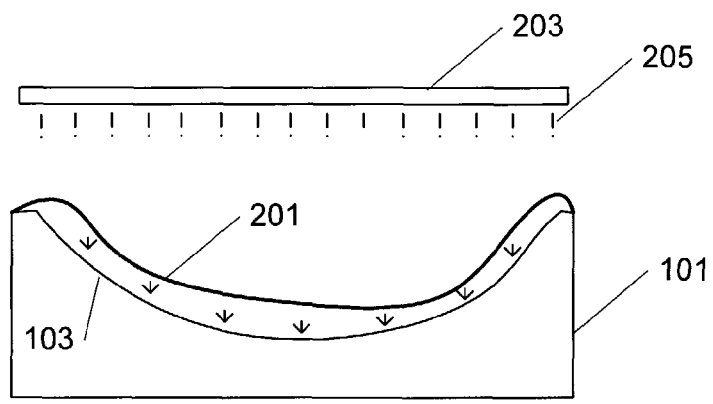
FIG. 2 is a cross-sectional view of the open mould, wherein the film is adapted to the interior surface of the mould.

FIG. 2 is a cross-sectional view of the open mould 101, wherein it is illustrated how the thermoplastics film is adapted to the interior surface 103 of the open mould 101. A vacuum is provided between the film 201 and the interior surface 103, whereby the film 201 is sucked downwards towards the interior surface 103. In the shown example a light source 203 is also arranged for emitting heat rays that serve the purpose of heating the film, whereby the film is softened and hence forms a more even surface on the interior surface of the open mould. For heating of the film, it is an option to use eg an infrared (IR) illumination or ultraviolet (UV) illumination.

The thermoplastic film may be eg PMMA with a thickness within the interval of from 0.05 mm to 0.7 mm, preferably 0.4 mm. Examples of other applicable thermoplastics films could be ABS plastics, polyethylene, polypropylene or a mixture of said plastics types.

According to one embodiment the film can be attached to the edge of the mould by use of a tape such as eg Tacky Tape. Alternatively the film can be secured by use of a mechanical lock, eg a frame that rests on the edge, and the film rests between the frame and the edge of the open mould. The film could also be secured on the edge by means of a gasket or a vacuum groove.

Figure 3:
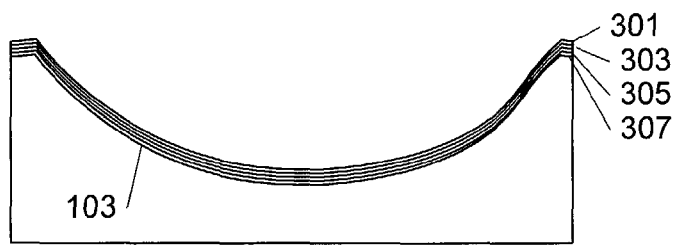
FIG. 3 is a cross-sectional view of the open mould, wherein several layers of film are arranged on the interior surface of the mould.

FIG. 3 is a cross-sectional view of the open mould 101, wherein several layers of film are arranged on top of each other 301, 303, 305, 307 on the interior surface 103 of the mould 101. Following arrangement of the film, a number of layers of fibre material are arranged, following which a resin is concludingly applied to join the individual layers of fibre material to each other, and when the resin is hardened a fibre-reinforced part is formed where several layers of film constitutes the distal layer. Thereby a layer of film can be removed, eg when the colour or the effect of the film has faded.

The individual layers of film can be adhered to each other prior to arrangement in the open mould by rolling; alternatively they can be joined by gluing with suitable glue.

Figure 4:
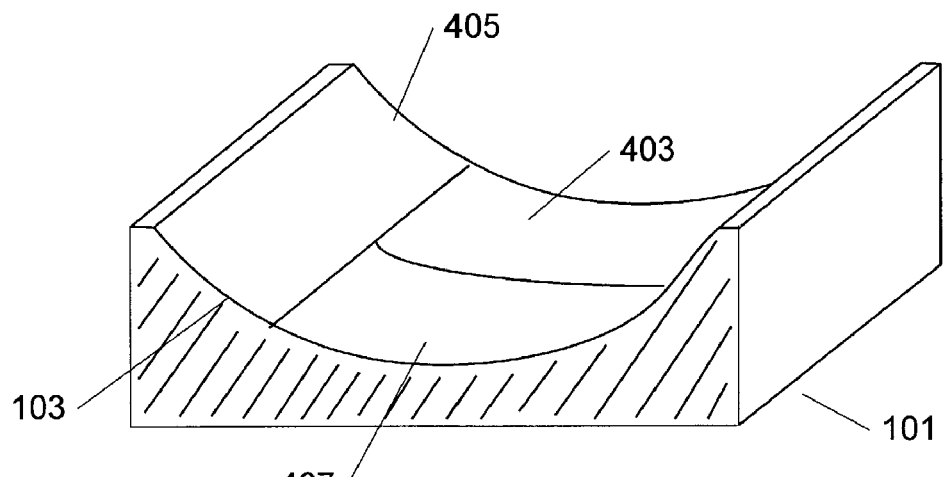
FIG. 4 is a cross-sectional view of the open mould wherein different films are arranged in different locations on the interior surface of the mould.

FIG. 4 is a cross-sectional view of the open mould 101 wherein different films 403, 405, 407 are arranged in different locations on the interior surface 103 of the mould. This can be done eg if it is desired to arrange films having different properties in different locations on the fibre-reinforced element to be moulded.

Figure 5:
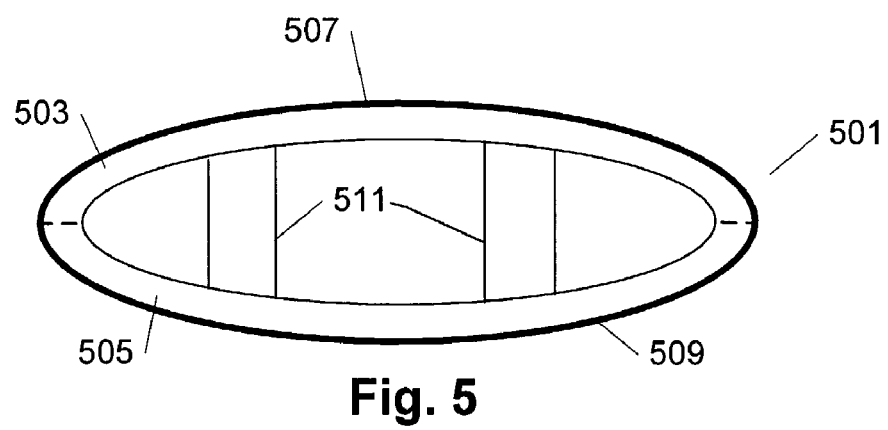
FIG. 5 is a cross-sectional view of a fibre-reinforced element according to the invention.

FIG. 5 is a cross-sectional view of a fibre-reinforce element 501 according to the invention. An element is shown which is structured from two combined fibre-reinforced elements 503, 505, wherein the outermost layer of the elements is of film 507, 509. Corresponding to the structuring of blades for a wind power plant, bracing beams 511 are arranged inside the hollow fibre-reinforced element 501. The fibre-reinforced elements 503, 505 with an outer layer of film can be moulded eg in an open mould as shown in FIG. 1, following which the fibre elements are combined to form the element 501. One possible embodiment in accordance with the invention is also that the fibre-reinforced parts are moulded without layers of film most distally and that they are subsequently added after the moulding procedure. The layer or layers of film can be applied both prior to and after assembly processes, grinding procedure or any other kind of further treatment, if any. For instance, layers of film can be applied as finish across joints and contribute to their strength.

Figure 6:
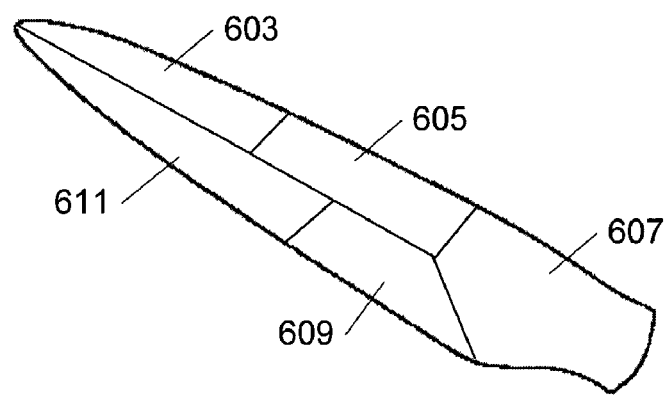
FIG. 6 shows a fibre-reinforced element in the form of a blade for a wind power plant, wherein the outermost layer is constituted of different types of film arranged in different locations on the blade.

FIG. 6 shows a fibre-reinforced element in the form of a blade 601 for a wind power plant, wherein the outermost layer is constituted of different types of film arranged in different locations 603, 605, 607, 609 of the blade.

It will be understood that the invention as disclosed in the present description and figures can be modified or amended while continuing to be comprised by the protective scope conferred by the following claims.

The invention claimed is:

1. A method of manufacturing at least one fibre-reinforced part for a wind power plant, wherein the method comprises:
   laying out different layers of film comprising a layer of fibre material in an interior surface of an open mould, so that several of the different layers of film are arranged outermost on the interior surface of the open mould;
   applying resin for joining of the laid-out layers; and
   curing the resin so that the several layers of film constitute an outermost part of the fiber-reinforced part.

2. The method according to claim 1, wherein at least one layer of film is a thermoplastic material.

3. The method according to claim 1, wherein at least one layer of film is adapted to a shape of the interior surface of the open mould by applying a vacuum between the interior surface and the at least one layer of film.

4. The method according to claim 1, wherein at least one layer of film is adapted to a shape of the interior surface of the open mould by heating the at least one layer of film.

5. The method according to claim 4, wherein the heating takes place by use of heat-emitting radiation.

6. The method according to claim 1, wherein films with different properties are arranged in different locations on the interior surface of the open mould.

7. The method according to claim 1, further comprising arranging at least one layer of film on at least a part of the fibre-reinforced part following removal from the mould.

8. A fibre-reinforced part for a wind power plant, comprising:
   an outermost part comprised of several layers of film;
   at least one layer of fibre material; and
   resin joining the at least one layer of fibre material with at least one of the several layers of film of the outermost part.

9. The fibre-reinforced part according to claim 8, wherein films of the outermost part having different properties are arranged in different locations on the fibre-reinforced part.

10. The fibre-reinforced part according to claim 8, wherein at least one of the several layers of film of the outermost part is ice-repellent.

11. The fibre-reinforced part according to claim 8, wherein at least one of the several layers of film has a surface that is aerodynamically optimised.

12. The fibre-reinforced part according to claim 8, wherein the part is a wind power plant blade.

* * * * *